United States Patent [19]

Ahearn et al.

[11] 4,336,793
[45] Jun. 29, 1982

[54] STRIP FOR FORMING A SOLAR PANEL

[75] Inventors: James J. Ahearn, Hampton; Kenneth C. Culph, Mount Waverley, both of Australia

[73] Assignee: Ahearn, Main & Stott Pty. Ltd., North Richmond, Australia

[21] Appl. No.: 197,435

[22] Filed: Oct. 16, 1980

[30] Foreign Application Priority Data

Oct. 23, 1979 [AU] Australia ............... PE1035

[51] Int. Cl.³ .................................. F24J 3/02
[52] U.S. Cl. ............................... 126/450; 126/446; 126/448
[58] Field of Search ............... 126/445, 446, 447, 448, 126/450, 432; 165/171, 183

[56] References Cited

U.S. PATENT DOCUMENTS

| 3,366,170 | 1/1968 | Welz | 165/171 |
|---|---|---|---|
| 3,384,167 | 5/1968 | Javkin | 165/171 |
| 3,972,317 | 8/1976 | Gallagher | 126/446 |
| 4,011,856 | 3/1977 | Gallagher | 126/446 |
| 4,111,185 | 9/1978 | Swann | 126/448 |
| 4,111,188 | 9/1978 | Murphy, Jr. | 126/446 |
| 4,114,598 | 9/1978 | Van Leeuwen | 126/446 |
| 4,136,272 | 1/1979 | Rudd | 126/446 |
| 4,144,874 | 3/1979 | Zebuhr | 126/450 |
| 4,164,932 | 8/1979 | Gavin | 126/448 |
| 4,164,935 | 8/1979 | Marles et al. | 126/447 |
| 4,178,912 | 12/1979 | Felter | 126/449 |
| 4,221,208 | 9/1980 | Murphy, Jr. | 126/450 |

FOREIGN PATENT DOCUMENTS

| 478911 | 10/1974 | Australia . | |
|---|---|---|---|
| 591661 | 9/1977 | Fed. Rep. of Germany . | |
| 7705030 | 10/1977 | Fed. Rep. of Germany . | |
| 2734032 | 2/1978 | Fed. Rep. of Germany . | 126/446 |
| 2712532 | 9/1978 | Fed. Rep. of Germany . | |
| 7904356 | 8/1979 | Fed. Rep. of Germany . | |
| 2808723 | 9/1979 | Fed. Rep. of Germany . | |

Primary Examiner—James C. Yeung
Attorney, Agent, or Firm—Sughrue, Mion, Zinn, Macpeak & Seas

[57] ABSTRACT

A strip for forming a solar energy panel is disclosed. The strip has a configuration such that it interlocks with heat transfer conduits and adjacent strips can be interlocked together to form panels. The panels so formed can serve additionally as a roofing material.

9 Claims, 5 Drawing Figures

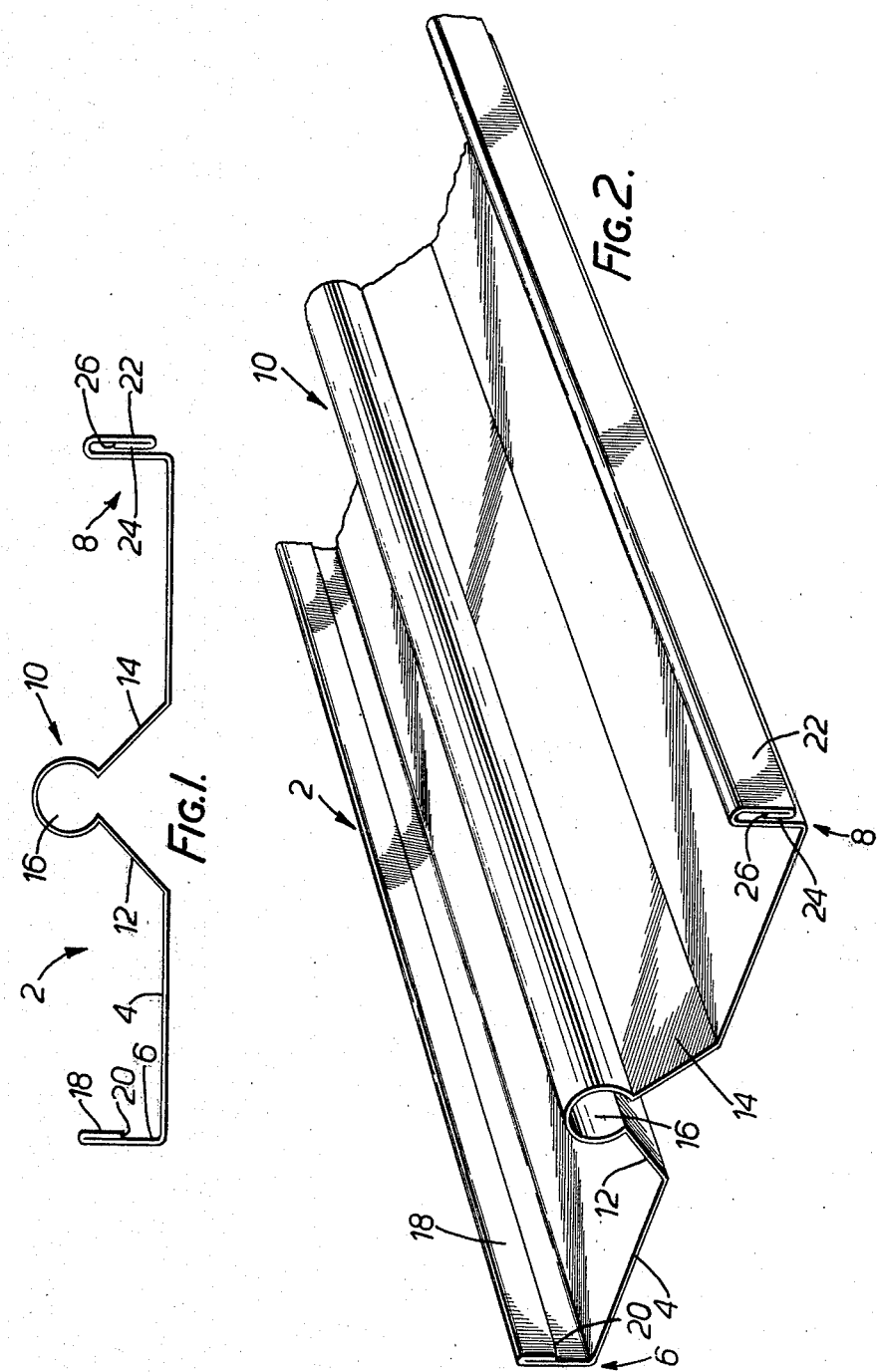

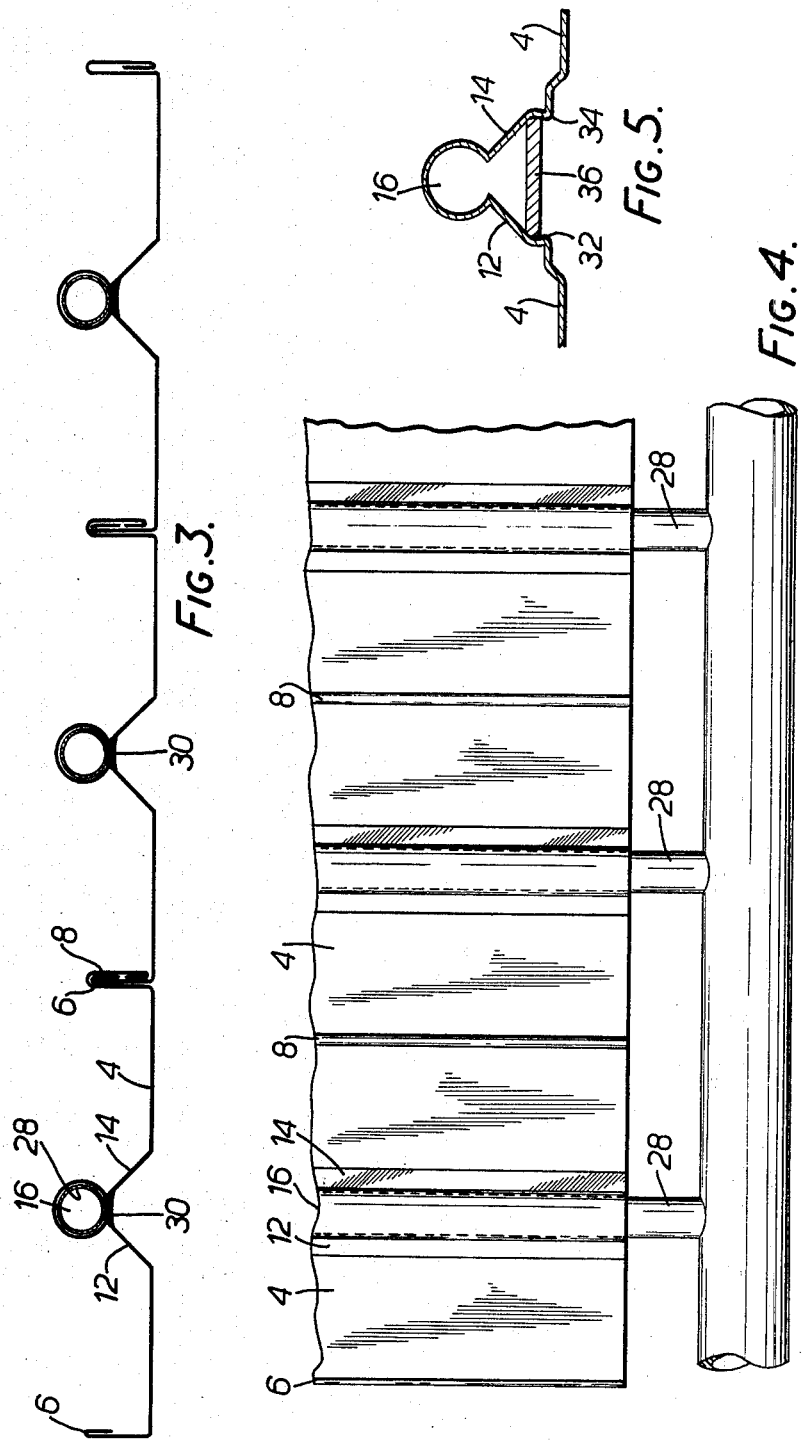

STRIP FOR FORMING A SOLAR PANEL

This invention relates to a strip for forming a solar panel which can be used for collecting and transferring solar energy to a heat transfer medium.

The general object of the present invention is to provide a strip of material of novel configuration which can be used for forming a solar collecting panel and additionally has sufficient structural strength that it can be used as a roofing material.

A search of prior publications has revealed a number of previous attempts to provide a solar energy panel which can additionally function as a roofing material. These arrangements are however somewhat complicated and thus would be relatively expensive to manufacture. For instance, U.S. Pat. No. 4,178,912 discloses an arrangement comprising roofing material in the form of a relatively deep trough within which are located a number of heat transfer conduits. The arrangement suffers the disadvantage that the sides of the trough would shade the energy absorbent surfaces at low angles of incidence of the sun and therefore reduce the effectiveness of the material. Further, the techniques suggested for forming the heat transfer conduit appear to be cumbersome.

U.S. Pat. No. 4,111,185 discloses another arrangement utilizing corrugated roofing material having heat transfer conduits cemented between adjacent corrugations. The material is covered by an energy transparent medium to reduce heat losses. The arrangement appears to be such that it would require almost total fabrication on site and would therefore be relatively expensive.

U.S. Pat. No. 4,111,188 discloses another arrangement which utilizes shingles which are formed from extruded material and it is believed that the cost of manufacturing and installing such extruded shingles would be prohibitive.

Other attempts in the prior art have been concerned with alternative techniques of making solar energy absorbing panels which do not form roofing material. For instance, U.S. Pat. No. 4,136,272 discloses a technique for induction welding heat transfer conduits to strip material. It is thought that the welding technique would be relatively expensive, and moreover the method of crimping adjacent edges of strips together is unsuitable for roofing applications. Further, there is no provision for providing solar energy collecting areas at low incident angles of the sun, other than the area of the heat transfer tubes themselves.

U.S. Pat. Nos. 4,114,598 and 4,144,874 disclose solar energy conversion panels which utilize extruded members of complicated configuration. It is thought that the cost of the extrusions would prevent widespread application of these proposals.

U.S. Pat. No. 4,164,932 concerns an alternative arrangement using complicated metal extrusions which cooperate to hold copper conduits therebetween. Again, it is thought that the cost of the extrusions would be prohibitive.

U.S. Pat. Nos. 3,972,317 and 4,011,856 disclose arrangements in which formed sheet metal is used to mechanically interlock with heat transfer conduits. However, in both patents the arrangements are such that the material would be quite unsuited for use as a roofing material and moreover there is no provision for collection of solar energy at large angles of incidence of the sun.

Generally speaking, the object of the present invention is to provide a strip material which is appropriately formed so that it interlocks with heat transfer conduits and moreover adjacent strips interlock with one another to form a viable roofing material.

More specifically, the invention provides a strip for forming a solar energy collecting panel said strip being formed from sheet metal and having an upper side and a lower side, said upper side being coated with solar energy absorbent material, said strip being formed with first and second flanges extending longitudinally on opposite marginal edges, said first and second flanges being of generally complementary shape so that the first flange can interlock with the second flange of an adjacent strip whereby a plurality of strips can be interlocked together to form said panel, said strip being formed with a longitudinally extending portion intermediate of the first and second flanges, said portion projecting upwardly from said upper side, said portion including an elongate channel which is open to the lower side of the strip, said channel receiving and snugly engaging, in use, a conduit for a heat transfer fluid, said channel being shaped so as to engage more than approximately 225° of the circumference of said conduit.

The invention will now be further described with reference to the accompanying drawings, in which:

FIG. 1 is a cross-section through a preferred form of strip of the invention;

FIG. 2 is a perspective view of the strip of FIG. 1;

FIG. 3 is a cross-section through a number of strips interlocked together at their side edges to form a solar collecting panel;

FIG. 4 is a plane view of a solar collecting panel constructed in accordance with the invention; and FIG. 5 shows a slight modification of the strip shown in FIG. 1.

The strip 2 of the invention is preferably roll formed from 26 gauge galvanised mild steel sheet into the configuration illustrated in FIG. 1. In particular the strip has a base 4 and first and second elongate side flanges 6 and 8. In addition the strip is formed with a central projecting portion 10 which includes first and second inclined surfaces 12 and 14, which are directed towards one another and are inclined at approximately 45° to the base 4. The upper edges of the inclined surfaces 12 and 14 are joined by a contiguous part-circular channel portion 16, the portion 16 extending approximately 270° about its centre. The first flange 6 includes a downturned portion 18 the lower edge of which defines a shoulder 20. The second flange 8 includes a first downturned portion 22 which defines an inverted channel section and an upturned peripheral portion 24 which defines an upwardly facing shoulder 26. As best illustrated in FIG. 3 the flanges 6 of one strip can be inserted into the channels formed at the second flanges 8 of adjacent strips whereby the strips are interlocked together to form a solar collecting panel. The shoulders 20 and 26 of the flanges 6 and 8 abut one another and maintain the strips interlocked together. It will be noted that the interlocking arrangement would be weatherproof and thus the panels are suitable for use as roofing material. To improve the efficiency of the strips as solar panels it is desirable to coat the outer surface with known solar energy absorptive coverings.

The inclined surfaces 12 and 14 are especially suitable for receiving solar energy at those times when the sun is low in the sky. The configuration of the channel portion 16 is such that it establishes a relatively large area of thermal contact with conduits 28 which are located therein, as seen in FIGS. 3 and 4. The conduits 28 are preferably formed from copper tube and have an outer diameter which approximately equals the inner diameter of the channels 16 and are slid into the channels 16 from ends thereof. Once the conduits are located in the channels the openings of the channels are sealed against the conduits and against the lower faces of the inclined surfaces 12 and 14 to prevent moisture entering any gaps between the conduits 28 and the channel 16 since otherwise this region would be susceptible to corrosion. A commercially available silicon mastic is suitable for this purpose and is applied in a fillet 30 as illustrated in FIG. 3.

The upper and lower ends of the conduits 28 are preferably connected to header tubes 30 as illustrated in FIG. 4 for circulation of a suitable heat transfer fluid which is heated indirectly by the solar energy received by the strip 2.

The arrangement illustrated in FIG. 5 is generally similar to the strip illustrated in FIG. 1 except that the inclined surfaces 12 and 14 include longitudinally extending grooves 32 and 34. The grooves 32 and 34 serve to strengthen the strip and additionally permit the insertion of a protective strip 36 which serves to shield the rear face of the conduit 28 which would otherwise be exposed. The arrangement illustrated in FIG. 5 is particularly suited to an alternative use of the strip in fences, especially fences surrounding swimming pools and the like.

Many modifications will be apparent to those skilled in the art without departing from the spirit and scope of the invention.

We claim:

1. A strip for forming a combination solar energy collecting panel and roof surface, said strip being formed from sheet metal and having a flat upper side and a lower side, said upper side being coated with solar energy absorbent material, said strip being formed with first and second flanges extending longitudinally on opposite marginal edges, said first and second flanges being of generally complementary shape so that the first flange can interlock with the second flange of an adjacent strip whereby a plurality of strips can be interlocked together to form said panel and said roof surface, said strip being formed with a longitudinally extending portion intermediate of the first and second flanges, said portion projecting upwardly from the said flat upper side, said portion including an elongate channel which is open to the lower side of the strip, said channel receiving and snugly engaging a conduit for a heat transfer fluid, said channel being shaped so as to engage more than approximately 225° of the circumference of said conduit, the upper extremity of the channel being located above the upper extremities of said first and second flanges, and wherein said longitudinally extending portion includes first and second longitudinally extending faces, said faces being generally perpendicular to one another and being joined together by said elongate channel.

2. A strip as claimed in claim 1 wherein said faces include longitudinally extending strengthening grooves.

3. A strip as claimed in claim 1 or 2 wherein said channel is shaped so as to engage 270° of the circumference of said conduit.

4. A strip as claimed in claim 1 wherein both the first and second flanges project upwardly relative to the upper face of the strip.

5. A strip as claimed in claim 4 wherein the first flange includes first and second legs which between them define a downwardly facing recess and the second flange includes a first leg adapted to fit in the recess of an adjacent strip.

6. A strip as defined in claim 5 wherein the first flange includes a third leg which extends upwardly from the second leg and within the recess and defines a shoulder and wherein the second flange includes a downturned leg the arrangement being such that the lower edge of said downturned leg of one strip engages the shoulder of an adjacent strip and thereby resists separation of adjacent strips.

7. A strip as claimed in claim 1 including said conduit the diameter of which is greater than that of said channel whereby conduit is tightly held in said channel.

8. A solar energy collector comprising a plurality of strips as defined in claim 7 interlocked together to form a panel the conduits thereof being connected to headers.

9. A solar energy collector as defined in claim 8 wherein said panel constitutes the roof of a building.

* * * * *